United States Patent
Takamatsu et al.

(10) Patent No.: US 8,760,097 B2
(45) Date of Patent: Jun. 24, 2014

(54) CONTROL DEVICE FOR CONVERTER AND ELECTRICALLY POWERED VEHICLE PROVIDED WITH THE SAME

(75) Inventors: Naoyoshi Takamatsu, Susono (JP); Masaki Okamura, Toyota (JP); Daigo Nobe, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 207 days.

(21) Appl. No.: 13/322,361

(22) PCT Filed: May 27, 2009

(86) PCT No.: PCT/JP2009/059666
§ 371 (c)(1),
(2), (4) Date: Nov. 23, 2011

(87) PCT Pub. No.: WO2010/137128
PCT Pub. Date: Dec. 2, 2010

(65) Prior Publication Data
US 2012/0068646 A1 Mar. 22, 2012

(51) Int. Cl.
*H02M 1/38* (2007.01)

(52) U.S. Cl.
USPC ........... 318/400.3; 318/400.26; 318/139; 327/533; 323/274; 323/275; 323/284; 323/277

(58) Field of Classification Search
USPC ............ 318/139, 400.26, 400.3, 400.28; 363/21.01; 323/286, 274, 275, 284, 323/277; 361/6, 56; 327/533
See application file for complete search history.

(56) References Cited

U.S. PATENT DOCUMENTS

| | | | | |
|---|---|---|---|---|
| 6,362,593 | B1 * | 3/2002 | Lee | 318/801 |
| 7,663,329 | B2 * | 2/2010 | Muta | 318/432 |
| 7,723,865 | B2 * | 5/2010 | Kitanaka | 307/45 |
| 7,834,578 | B2 * | 11/2010 | Sato | 318/800 |
| 7,855,901 | B2 * | 12/2010 | Oyobe et al. | 363/41 |
| 8,169,199 | B2 * | 5/2012 | Okamura et al. | 323/222 |
| 8,222,866 | B2 * | 7/2012 | Sugimoto et al. | 320/128 |
| 8,292,009 | B2 * | 10/2012 | Yamada et al. | 180/65.1 |
| 8,324,856 | B2 * | 12/2012 | Yamakawa et al. | 318/812 |

FOREIGN PATENT DOCUMENTS

| | | |
|---|---|---|
| EP | 2023471 A1 | 2/2009 |
| JP | 7-147775 A | 6/1995 |
| JP | 11-308871 A | 11/1999 |
| JP | 2004-112904 A | 4/2004 |
| JP | 2004-135465 A | 4/2004 |
| JP | 2004-271253 A | 9/2004 |
| JP | 2007-325435 A | 12/2007 |

* cited by examiner

*Primary Examiner* — Rita Leykin
(74) *Attorney, Agent, or Firm* — Sughrue Mion, PLLC

(57) ABSTRACT

A voltage control operation unit receives, from a subtraction unit, a value obtained by subtracting a detection value of a voltage from a voltage command value, and performs a control operation for setting the voltage to be equal to the voltage command value. The voltage control operation unit outputs the calculated control amount as a current command value. A current control operation unit receives, from a subtraction unit, a value obtained by subtracting a detection value of a current from a current command value, and performs a control operation for setting the current to be equal to the current command value. A driving signal generation unit generates a signal for driving a boost converter based on a duty command value received from the current control operation unit.

6 Claims, 16 Drawing Sheets

CONTROL DEVICE FOR CONVERTER AND ELECTRICALLY POWERED VEHICLE PROVIDED WITH THE SAME

CROSS REFERENCE TO RELATED APPLICATIONS

This application is a National Stage of International Application No. PCT/JP2009/059666, filed on May 27, 2009, the contents of all of which are incorporated herein by reference in their entirety.

TECHNICAL FIELD

The present invention relates to a control device for a converter and an electrically powered vehicle provided with the control device, and particularly to a control device for a converter provided between a direct-current (DC) power supply and an electrical load device and boosting the output voltage to be equal to or greater than the voltage of the DC power supply, and an electrically powered vehicle provided with the control device.

BACKGROUND ART

In the so-called chopper-type converter consisting of two switching elements and a reactor, in order to prevent these two switching elements from being simultaneously turned on (brought into conduction) when changing the switching states of these two switching elements, a dead time is generally provided during which both of the switching elements are temporarily turned off. However, there is a problem that, due to the influence of this dead time, the output voltage of the converter may vary when the direction of the current flowing through the reactor changes.

In order to address this problem, Japanese Patent Laying-Open No. 2007-325435 (PTL 1) discloses a power supply device that can suppress an unexpected increase in the output voltage of the boost converter. In this power supply device, when a phenomenon occurs in the switching cycle of the switching element in which the current flowing through the reactor of the boost converter is retained at a value 0 during the dead time, it is determined that the cyclical zero current retention state is brought about. Then, the voltage command value of the boost converter is corrected downward by a prescribed voltage. This allows suppression of an unexpected increase in the output voltage of the boost converter caused due to the influence of the dead time (see PTL 1).

CITATION LIST

Patent Literature

PTL 1: Japanese Patent Laying-Open No. 2007-325435
PTL 2: Japanese Patent Laying-Open No. 2004-112904
PTL 3: Japanese Patent Laying-Open No. 2004-135465
PTL 4: Japanese Patent Laying-Open No. 07-147775
PTL 5: Japanese Patent Laying-Open No. 11-308871

SUMMARY OF INVENTION

Technical Problem

In the power supply device disclosed in the above-mentioned patent literature, it is determined based on the voltage detection value of the lower arm of the boost converter and the detection value of the reactor current whether the zero current retention state arises or not, and based on the determination result, the boost converter is controlled. Accordingly, due to errors and the like of the sensor detecting the voltage of the lower arm and the reactor current, an erroneous determination may be made as to whether the zero current retention state arises or not. Consequently, there is a possibility that the voltage variation cannot be suppressed.

Furthermore, according to the method disclosed in each of the above-mentioned patent literature, when it is determined that the zero current retention state occurs, the voltage command value of the boost converter is corrected downward by a prescribed voltage, to thereby suppress an unexpected increase in the output voltage of the boost converter caused due to the influence of the dead time. However, the variation itself of the output voltage of the boost converter is not suppressed.

Therefore, an object of the present invention is to provide a control device for a converter capable of suppressing variation of the converter output voltage caused due to the influence of the dead time and an electrically powered vehicle provided with the control device for a converter.

Solution To Problem

The present invention provides a control device for a converter that is provided between a DC power supply and an electrical load device and boosts an output voltage to a value not less than a voltage of the DC power supply. The converter includes a reactor, first and second switching elements, and first and second diodes. The reactor has one end connected to a positive electrode of the DC power supply. The first switching element is connected between the other end of the reactor and the electrical load device. The second switching element is connected between the other end of the reactor and a negative electrode of the DC power supply. The first and second diodes are connected in anti-parallel to the first and second switching elements, respectively. An operation of the first and second switching elements includes a dead time for preventing the first and second switching elements from being simultaneously brought into conduction. The control device includes a voltage control unit, a current control unit and a signal generation unit. The voltage control unit performs a control operation for adjusting the output voltage to a target voltage. The current control unit performs a control operation for adjusting a current flowing through the reactor to a target current, using a control output of the voltage control unit as the target current. The signal generation unit generates a signal for driving the first and second switching elements based on the control output of the current control unit.

Preferably, the electrical load device includes an electric motor. The control device further includes a voltage control cycle setting unit. The voltage control cycle setting unit sets an operation cycle of the voltage control unit based on a cyclical electric power variation caused by rotation of the electric motor.

Further preferably, the voltage control cycle setting unit sets the operation cycle of the voltage control unit to be not more than one fourth of a cycle of the electric power variation.

Preferably, the electrical load device includes a first electric motor. The control device further includes a first variation estimation unit. Based on a torque and a rotation speed of the first electric motor, the first variation estimation unit estimates a first variation amount showing a cyclical electric power variation amount generated by rotation of the first electric motor. The current control unit performs the control operation using, as the target current, a value obtained by adding the first variation amount to the control output of the voltage control unit.

Further preferably, the electrical load device further includes a second electric motor. The control device further includes a second variation estimation unit. Based on a torque and a rotation speed of the second electric motor, the second variation estimation unit estimates a second variation amount showing a cyclical electric power variation amount generated by rotation of the second electric motor. The current control unit performs the control operation using, as the target current, a value obtained by adding the first variation amount and the second variation amount to the control output of the voltage control unit.

Furthermore, according to the present invention, an electrically powered vehicle includes a DC power supply; a driving force generation unit generating a driving force for a vehicle using an electric power supplied from the DC power supply; the above-described converter provided between the DC power supply and the driving force generation unit and boosting an input voltage of the driving force generation unit to a value not less than a voltage of the DC power supply; and the control device for a converter according to any one in the above description.

Advantageous Effects of Invention

The control device for a converter is provided with a current control unit performing a control operation for adjusting the current flowing through a reactor to a target current in which case the current control unit uses, as a target current, the control output of the voltage control unit performing the control operation for adjusting the output voltage to a target voltage. This allows suppression of occurrence of the phenomenon in which the current flowing through the reactor of the converter is retained at a value 0 during the dead time. Therefore, this control device for a converter can suppress the variation of the converter output voltage caused due to the influence of the dead time.

DESCRIPTION OF EMBODIMENTS

Figure 1:
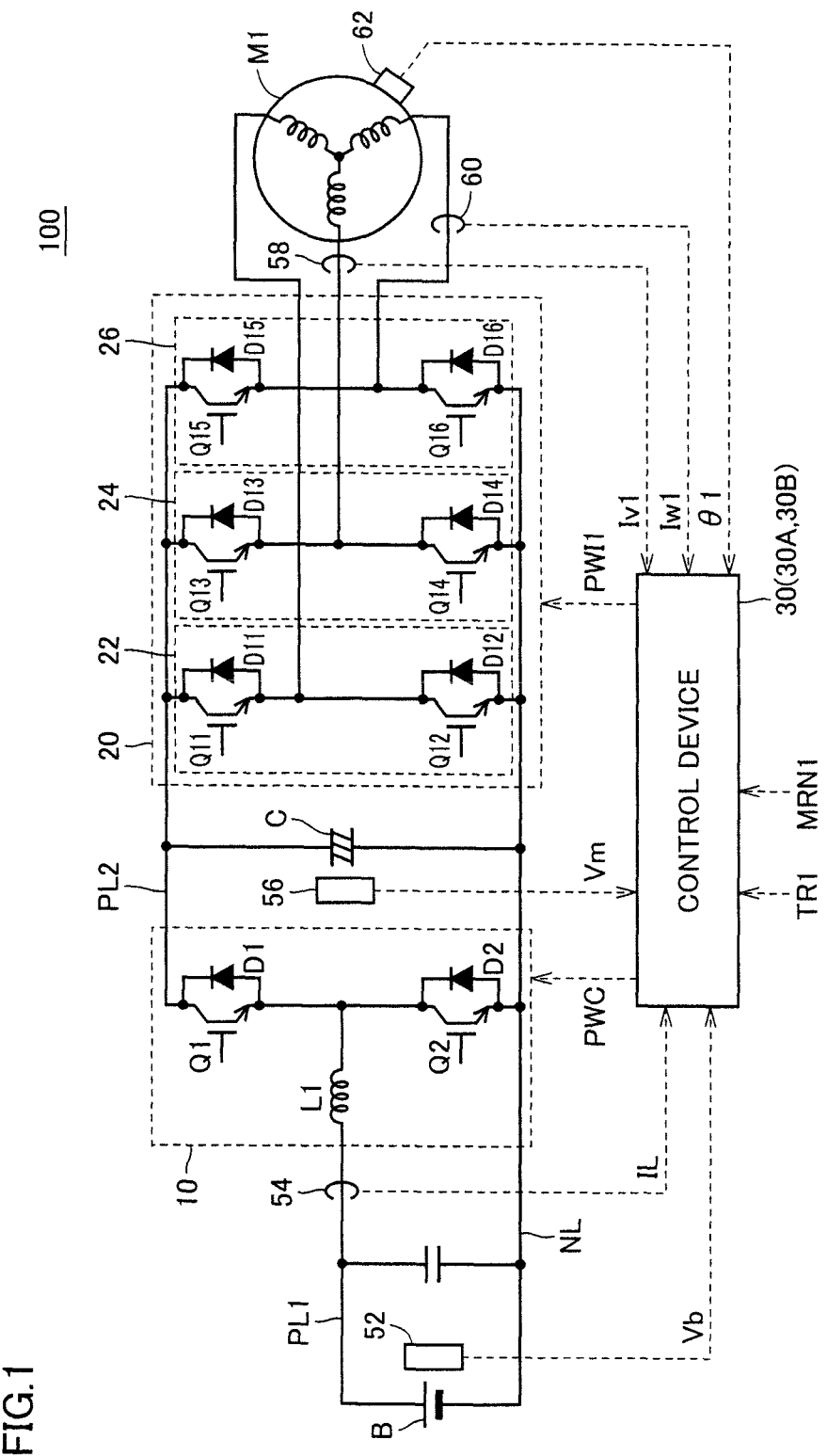
FIG. 1 is a diagram showing an electrical system of an electrically powered vehicle to which a control device for a converter according to the first embodiment of the present invention is applied.

The embodiments of the present invention will be hereinafter described in detail with reference to the accompanying drawings, in which the same or corresponding components are designated by the same reference characters, and description thereof will not be repeated.

[First Embodiment]

FIG. 1 is a diagram showing an electrical system of an electrically powered vehicle to which a control device for a converter according to the first embodiment of the present invention is applied. Referring to FIG. 1, an electrically powered vehicle 100 includes a DC power supply B, a boost converter 10, an inverter 20, a motor generator M1, positive electrode lines PL1 and PL2, a negative electrode line NL, and a smoothing capacitor C. Electrically powered vehicle 100 also includes a control device 30, voltage sensors 52 and 56, current sensors 54, 58 and 60, and a rotation angle sensor 62.

Boost converter 10 includes a reactor L1, power semiconductor switching elements (hereinafter simply referred to as a "switching element") Q1 and Q2, and diodes D1 and D2. Reactor L1 has one end connected to positive electrode line PL1 connected to a positive electrode of DC power supply B and also has the other end connected to the intermediate point between switching element Q1 and switching element Q2, that is, the connection point between the emitter of switching element Q1 and the collector of switching element Q2. Switching elements Q1 and Q2 are connected in series between positive electrode line PL2 and negative electrode line NL connected to a negative electrode of DC power supply B. Switching element Q1 has a collector connected to positive electrode line PL2 while switching element Q2 has an emitter connected to negative electrode line NL. Diodes D1 and D2 are provided between the collector and the emitter of each of switching elements Q1, Q2, respectively, to cause a current to flow from the emitter side to the collector side.

For example, an IGBT (Insulated Gate Bipolar Transistor), a power MOS (Metal Oxide Semiconductor) transistor and the like can be used as switching elements Q1 and Q2 described above and switching elements Q11 to Q16 and Q21 to Q26 which will be described below.

Inverter 20 includes a U-phase arm 22, a V-phase arm 24 and a W-phase arm 26. U-phase arm 22, V-phase arm 24 and W-phase arm 26 are connected in parallel between positive electrode line PL2 and negative electrode line NL. U-phase arm 22 includes switching elements Q11 and Q12 connected in series. V-phase arm 24 includes switching elements Q13 and Q14 connected in series. W-phase arm 26 includes switching elements Q15 and Q16 connected in series. Diodes D11 and D16 are provided between the collector and the emitter of each of switching elements Q11 to Q16, respectively, to cause a current to flow from the emitter side to the collector side. The intermediate point of each phase arm is connected to each phase coil of motor generator M1.

DC power supply B is a rechargeable power storage device which is, for example, a nickel-metal hydride or lithium-ion secondary battery. It is to be noted that DC power supply B may be an electric double layer capacitor, a large-capacity capacitor, a flywheel and the like in place of a secondary battery.

Based on a signal PWC from control device 30, boost converter 10 boosts the voltage between positive electrode line PL2 and negative electrode line NL (which will be hereinafter referred to as a "system voltage") to a value not less than the output voltage of DC power supply B. When the system voltage is lower than a target voltage, the on-duty of switching element Q2 is increased to thereby allow the current to flow from positive electrode line PL1 to positive electrode line PL2, so that the system voltage can be raised. On the other hand, when the system voltage is higher than the target voltage, the on-duty of switching element Q1 is increased to thereby allow the current to flow from positive electrode line PL2 to positive electrode line PL1, so that the system voltage can be decreased.

Based on a signal PWI1 from control device 30, inverter 20 converts the DC power supplied from positive electrode line PL2 and negative electrode line NL into a three-phase alternating current, to output the current to motor generator M1 and drive motor generator M1. This causes motor generator M1 to be driven so as to generate a torque specified by a torque command value TR1. Furthermore, during braking of the vehicle, inverter 20 converts the three-phase alternating-current (AC) power generated by motor generator M1 into a direct current based on signal PWI1, and outputs the current to positive electrode line PL2 and negative electrode line NL.

Smoothing capacitor C is connected between positive electrode line PL2 and negative electrode line NL. Smoothing capacitor C serves to reduce ripples in positive electrode line PL2 and negative electrode line NL.

Motor generator M1 is an AC electric motor which is, for example, a three-phase AC electric motor provided with a rotor having a permanent magnet embedded therein. Motor generator M1 is mechanically coupled to a driving wheel which is not shown and generates a torque for driving the vehicle. Furthermore, during braking of the vehicle, motor generator M1 receives kinetic energy of the vehicle from the driving wheel to generate electric power. In addition, if this electrically powered vehicle 100 is a hybrid vehicle, motor generator M1 may be incorporated in the hybrid vehicle as a component which is mechanically coupled to the engine which is not shown. Motor generator M1 uses the motive power of the engine to generate electric power and starts the engine.

Voltage sensor 52 detects a voltage Vb of DC power supply B and outputs the detection value to control device 30. Current sensor 54 detects a current IL flowing through reactor L1 of boost converter 10 and outputs the detection value to control device 30. Voltage sensor 56 detects the voltage across the terminals of smoothing capacitor C, that is, a voltage Vm between positive electrode line PL2 and negative electrode line NL. Voltage sensor 56 then outputs the detection value to control device 30. Current sensors 58 and 60 detect a V-phase current Iv1 and a W-phase current Iw1, respectively, and output these detection values to control device 30. Rotation angle sensor 62 detects a rotation angle θ1 of the rotor of motor generator M1 and outputs the detection value to control device 30.

Based on the detection value of each of voltages Vb and Vm from voltage sensors 52 and 56, respectively, and current IL from current sensor 54, control device 30 generates a signal for driving boost converter 10 and outputs the generated signal as signal PWC to boost converter 10. Furthermore, based not only on the detection value of each of currents Iv1 and Iw1 from current sensors 58 and 60, respectively, rotation angle θ1 from rotation angle sensor 62 and voltage Vm but also on torque command value TR1 and a motor rotation speed MRN1 of motor generator M1 that are received from an external ECU which is not shown, control device 30 generates signal PWI1 for driving motor generator M1 and outputs the generated signal PWI1 to inverter 20.

Figure 2:
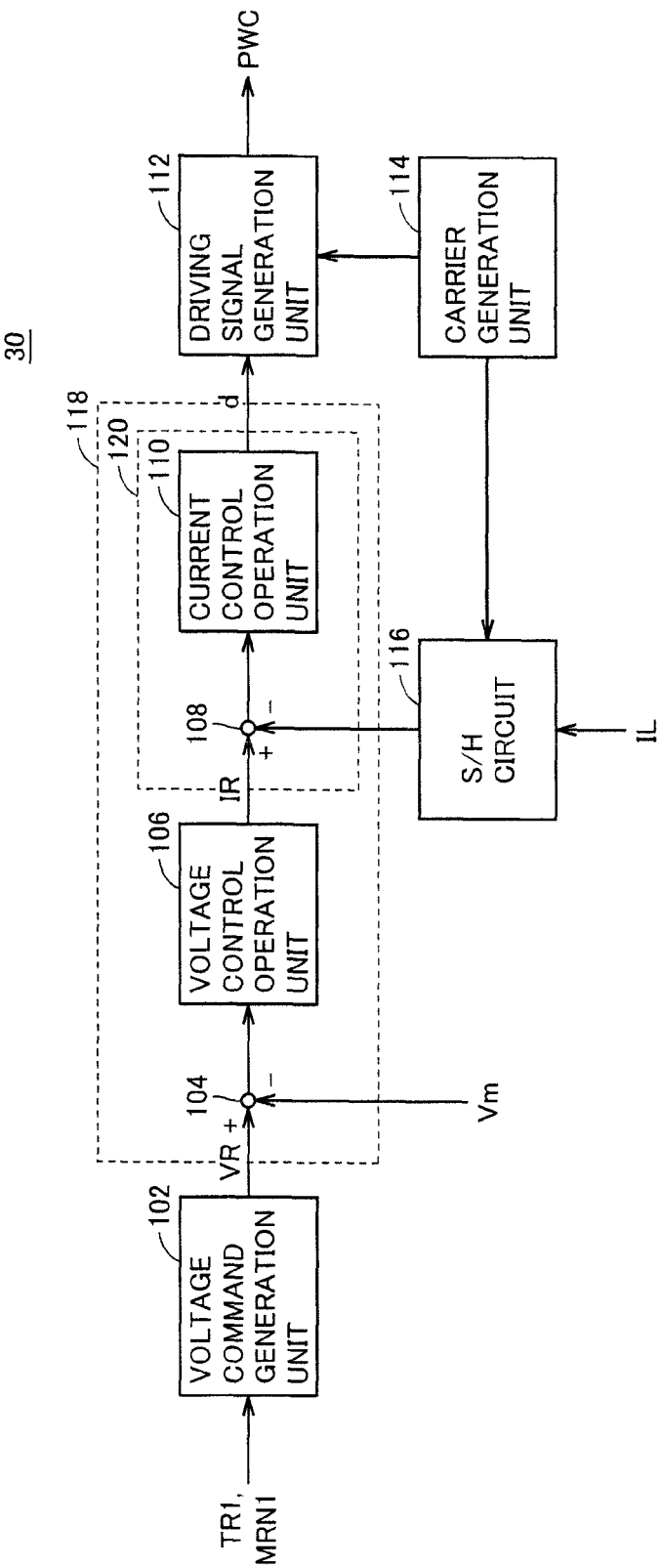
FIG. 2 is a functional block diagram of a portion of the control device shown in FIG. 1 that is related to control of a boost converter.

FIG. 2 is a functional block diagram of a portion of control device 30 shown in FIG. 1 that is related to control of boost converter 10. Referring to FIG. 2, control device 30 includes a voltage command generation unit 102, subtraction units 104, 108, a voltage control operation unit 106, a current control operation unit 110, a driving signal generation unit 112, a carrier generation unit 114, and a sample/hold (hereinafter referred to as "S/H") circuit 116.

Voltage command generation unit 102 generates a voltage command value VR showing the target value of voltage Vm which is an output voltage of boost converter 10. For example, voltage command generation unit 102 generates voltage command value VR based on the power of motor generator M1 calculated from torque command value TR1 and motor rotation speed MRN1 of motor generator M1.

Subtraction unit 104 subtracts the detection value of voltage Vm from voltage command value VR, and outputs the calculation result to voltage control operation unit 106. Voltage control operation unit 106 receives, from subtraction unit 104, the value obtained by subtracting the detection value of voltage Vm from voltage command value VR and performs the control operation for adjusting voltage Vm to be equal to voltage command value VR (for example, proportional-plus-integral control). Then, voltage control operation unit 106 outputs the calculated control amount as a current command value IR.

Carrier generation unit 114 generates a carrier signal consisting of a triangular wave for generating a PWM (Pulse Width Modulation) signal in driving signal generation unit 112 described below, and outputs the generated carrier signal to driving signal generation unit 112 and S/H circuit 116. S/H circuit 116 performs sampling of current IL at the timing of each of the peak and the bottom of the carrier signal received from carrier generation unit 114.

Subtraction unit 108 subtracts the detection value of current IL sampled/held by S/H circuit 116 from current command value IR output from voltage control operation unit 106, and outputs the calculation result to current control operation unit 110. Current control operation unit 110 receives, from subtraction unit 108, the value obtained by subtracting the detection value of current IL from current command value IR and performs the control operation for adjusting current IL to be equal to current command value IR (for example, proportional-plus-integral control). It is to be noted that the operation cycle of current control operation unit 110 is set to be shorter than the operation cycle of voltage control operation unit 106. Then, current control operation unit 110 outputs the calculated control amount as a duty command value d to driving signal generation unit 112.

Driving signal generation unit 112 compares the magnitudes of duty command value d received from current control operation unit 110 and the carrier signal received from carrier generation unit 114, and generates signal PWC which varies in logical state in accordance with the comparison result. Then, driving signal generation unit 112 outputs the generated signal PWC to switching elements Q1 and Q2 of boost converter 10.

In this control device 30, voltage control operation unit 106 performs the control operation for adjusting voltage Vm to be equal to voltage command value VR (voltage control). Then, current control operation unit 110 performs the control operation for adjusting current IL to be equal to current command value IR, using the control output of voltage control operation unit 106 as current command value IR of current IL (current control). Thus, when the deviation of voltage Vm with respect to voltage command value VR occurs, current command value IR is corrected so as to eliminate the deviation and the current control is performed so as to adjust current IL to be equal to current command value IR. Accordingly, it becomes possible to suppress occurrence of the phenomenon in which the reactor current (current IL) is retained at a value 0 during the dead time. Consequently, the variation of voltage Vm is suppressed.

In addition, subtraction unit 104, voltage control operation unit 106, subtraction unit 108, and current control operation unit 110 foriii a main loop 118 for adjusting voltage Vm to be equal to voltage command value VR while subtraction unit 108 and current control operation unit 110 form a minor loop 120 for adjusting current IL to be equal to current command value IR.

Figure 3:
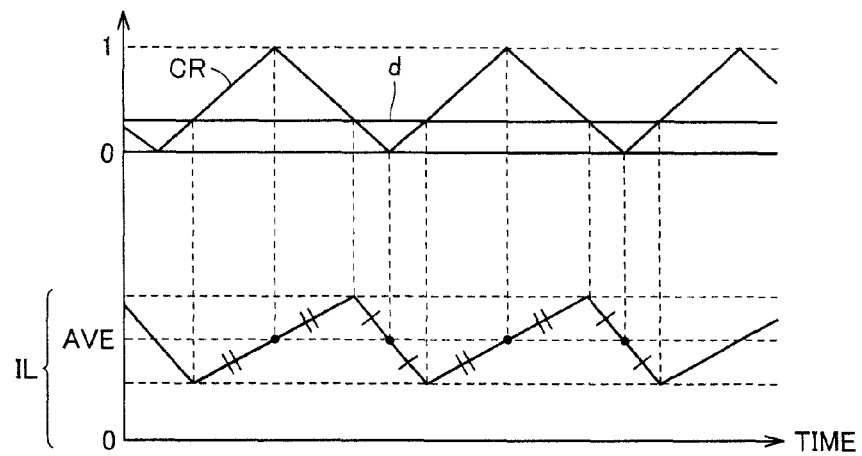
FIG. 3 is a diagram for illustrating the sampling timing of the current by a sample/hold circuit shown in FIG. 2.

FIG. 3 is a diagram for illustrating the sampling timing of current IL by S/H circuit 116 shown in FIG. 2. Referring to FIG. 3, S/H circuit 116 performs sampling of current IL at each of the peak and the bottom of carrier signal CR that is generated by carrier generation unit 114 (FIG. 2). Accordingly, the intermediate value of the ripple variations of current IL can be sampled, so that the average value of current IL can be acquired in principle. This average value of current IL is used to allow improvement in the responsiveness of the current control performed by current control operation unit 110.

Figure 4:
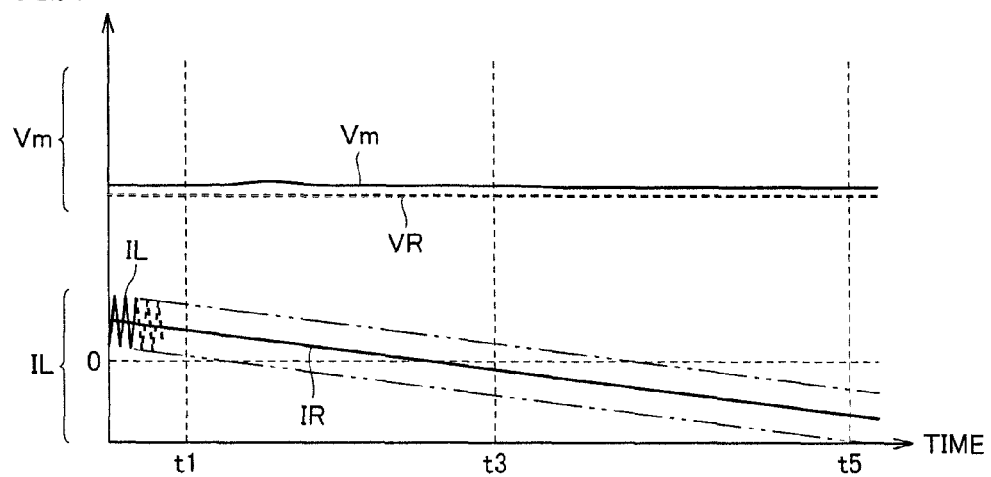
FIG. 4 is a diagram showing the voltage and the current at the time when the direction of the current flowing through a reactor changes.
Figure 5:
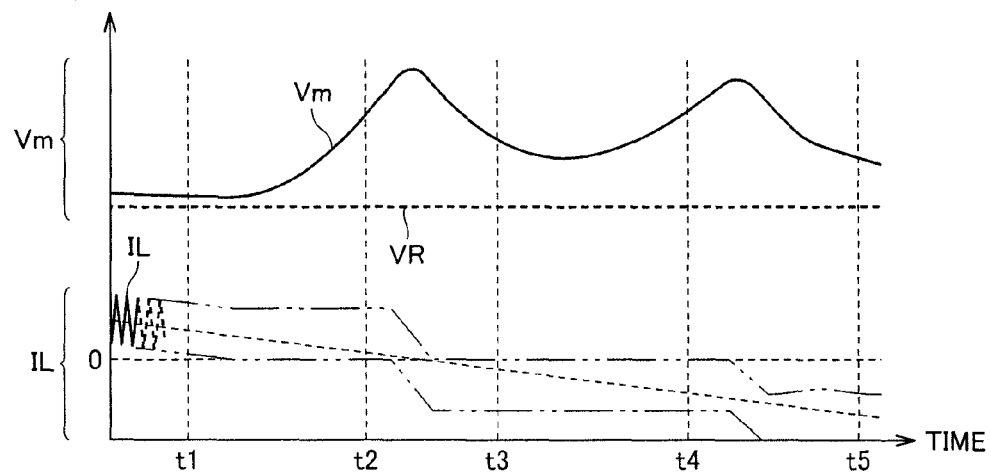
FIG. 5 is a diagram showing the voltage and the current in the case where the current control in the first embodiment is not provided.

FIG. 4 is a diagram showing voltage Vm and current IL at the time when the direction of current IL flowing through reactor L1 changes. As described above, when the direction of current IL flowing through reactor L1 changes, the output voltage of the boost converter may vary due to the influence of the dead time. For the purpose of comparison, FIG. 5 shows voltage Vm and current IL in the case where this current control in the first embodiment is not provided (in other words, only the voltage control performed by voltage control operation unit 106 is provided, which is equivalent to the conventional technique). By way of example, FIGS. 4 and 5 each show voltage Vm and current IL at the time when current IL changes from positive (in which current flows from DC power supply B to reactor L1) to negative (in which current flows from reactor L1 to DC power supply B).

Referring to FIGS. 4 and 5, when the direction of current IL changes from positive to negative, the output voltage of the converter may rise due to the influence of the dead time. When only the voltage control by voltage control operation unit 106 is performed (FIG. 5), duty command value d is not changed unless the deviation between voltage command value VR (not shown) and voltage Vm is increased to some extent. In this case, the rise of voltage Vm cannot be completely suppressed. As to current IL, as will be described later in detail, a phenomenon occurs in which current IL is temporarily retained at a value 0 due to the influence of the dead time, which leads to variation in voltage Vm.

In contrast, as shown in FIG. 4, in the first embodiment in which current control is performed, current command value IR of current IL is generated so as to eliminate the voltage deviation, and current control is performed so as to adjust current IL to be equal to the generated current command value IR. This allows suppression of occurrence of the phenomenon in which current IL is retained at a value 0. Therefore, variation in voltage Vm as shown in FIG. 5 does not occur. Consequently, in the first embodiment, smoothing capacitor C (FIG. 1) can be decreased in size to allow a decrease in the cost of the system.

Figure 6:
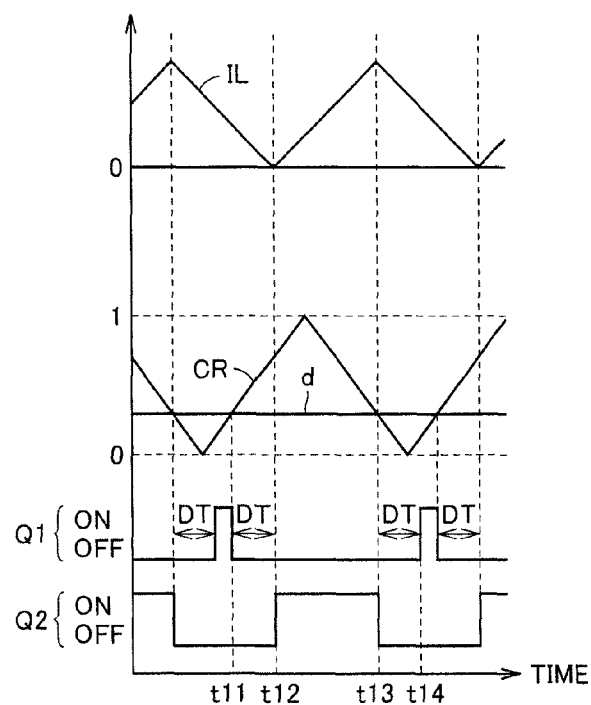
FIG. 6 is a diagram showing the operation of the switching element and the behavior of the current in the vicinity of a time t1 in FIG. 4.
Figure 7:
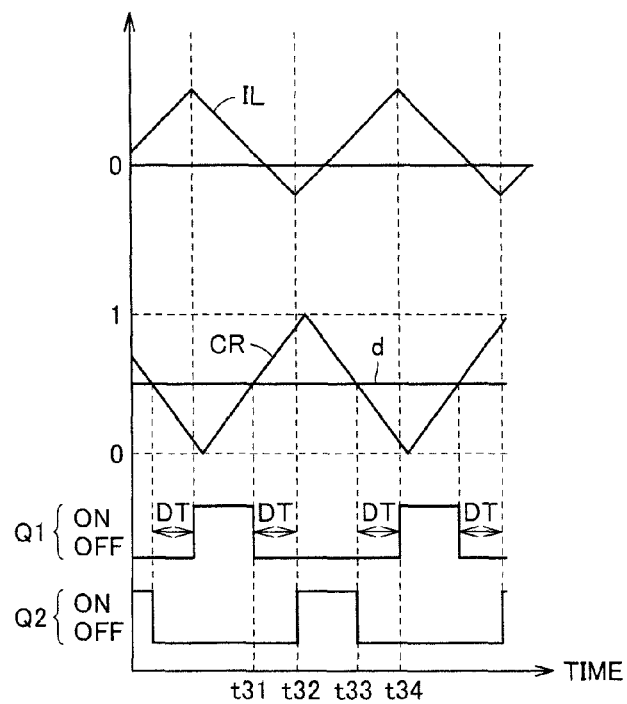
FIG. 7 is a diagram showing the operation of the switching element and the behavior of the current in the vicinity of a time t3 in FIG. 4.
Figure 8:
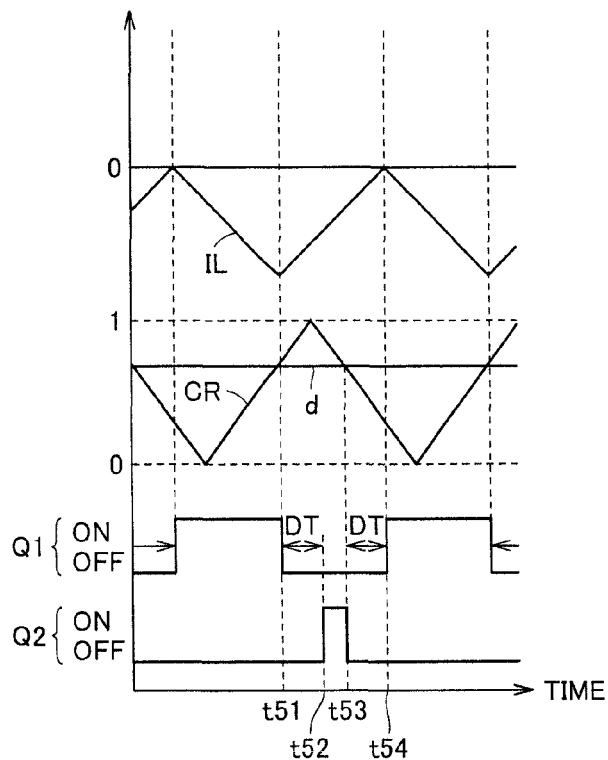
FIG. 8 is a diagram showing the operation of the switching element and the behavior of the current in the vicinity of a time t5 in FIG. 4.

FIGS. 6 to 10 each are a diagram for illustrating the behavior of current IL shown in FIGS. 4 and 5 in greater detail. FIGS. 6 to 8 each show the operation of each of switching elements Q1, Q2 and the behavior of current IL in the vicinity of each of times t1, t3 and t5 in FIG. 4. Referring to FIG. 6, for example, at a time t11, when carrier signal CR is greater than duty command value d, switching element Q1 of the upper arm is turned off In this case, switching element Q2 of the lower arm is not immediately turned on while switching element Q2 is turned on at a time t12 after a lapse of a dead time DT.

Then, when carrier signal CR is smaller than duty command value d at a time t13, switching element Q2 is turned off. In this case, switching element Q1 is not immediately turned on while switching element Q1 is turned on at a time t14 after a lapse of dead time DT.

The description of each of FIGS. 7 and 8 is the same as that of FIG. 6, and therefore, will not be repeated.

Figure 9:
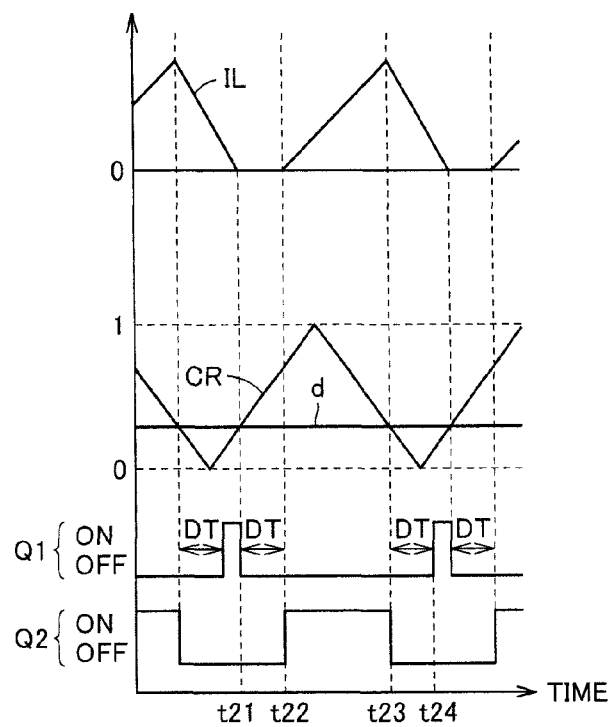
FIG. 9 is a diagram showing the operation of the switching element and the behavior of the current in the vicinity of a time t2 in FIG. 5.
Figure 10:
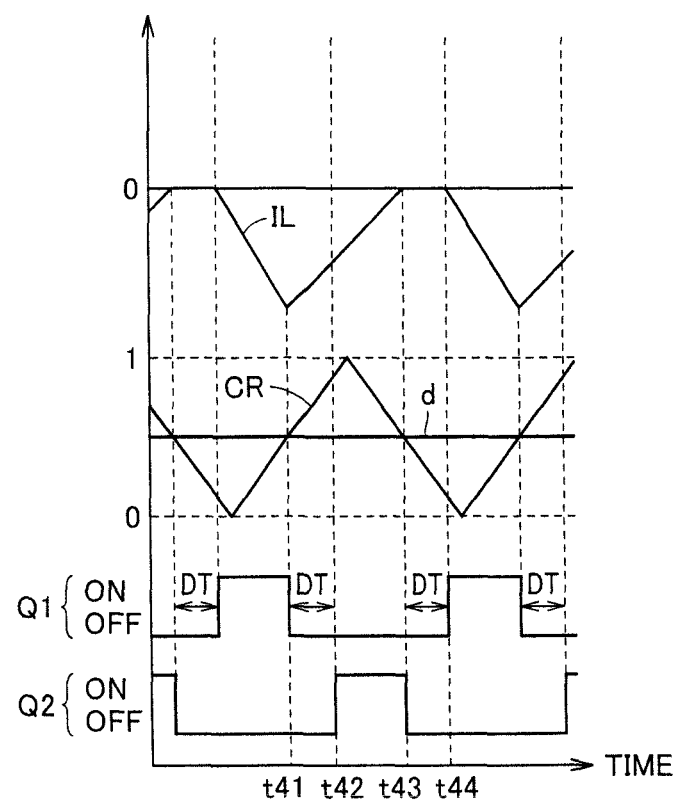
FIG. 10 is a diagram showing the operation of the switching element and the behavior of the current in the vicinity of a time t4 in FIG. 5.

FIGS. 9 and 10 each show the operation of each of switching elements Q1 and Q2 and the behavior of current IL in the vicinity of each of times t2 and t4 in FIG. 5. Referring to FIG. 9, for example, when carrier signal CR is greater than duty command value d at a time t21, switching element Q1 of the upper arm is turned off. In this case, if switching element Q2 of the lower aim is immediately turned on, current IL will be immediately increased. Under the circumstance where current control is not performed, however, current IL reaches zero due to dead time DT (current retention).

Then, at a time t22 after a lapse of dead time DT, switching element Q2 is turned on and current IL starts to flow.

Referring to FIG. 10, for example, when carrier signal CR is smaller than duty command value d at a time t43, switching element Q2 of the lower arm is turned off. In this case, when switching element Q1 of the upper arm is immediately turned on, negative current IL will immediately flow. Under the circumstance where current control is not performed, however, current IL reaches zero due to dead time DT (current retention).

Then, at a time t44 after a lapse of dead time DT, switching element Q1 is turned on and negative current IL starts to flow.

In this way, when the direction of current IL changes (when the absolute value of current IL is decreased), the current retention occurs in which current IL reaches a value 0 due to the influence of dead time DT. Consequently, voltage Vm may vary. Thus, in the first embodiment, the current control is performed so as to adjust current IL to be equal to current command value IR. Accordingly, when current retention occurs due to the influence of the dead time, duty command value d is immediately changed based on the deviation between current command value IR and current IL, so that current retention can be eliminated.

It is to be noted that a limiter may be provided on the output side of voltage control operation unit 106 (FIG. 2) to impose an upper limit on current command value IR. Consequently, an overcurrent can be prevented from flowing through boost converter 10.

As described above, in the first embodiment, since current control operation unit 110 is provided for controlling current IL flowing through reactor L1 to be adjusted at current command value IR, it becomes possible to suppress occurrence of the phenomenon in which current IL is retained at a value 0 during the dead time. Therefore, according to the first embodiment, variation of voltage Vm caused due to the influence of the dead time can be suppressed.

Consequently, smoothing capacitor C can be reduced in size to allow a decrease in size and cost of the device. Furthermore, since voltage Vm is stabilized, the control of motor generator M1 by inverter 20 can be rendered highly responsive. Furthermore, it is not necessary to take measures such as lowering the carrier frequency for suppressing variation of voltage Vm caused due to the influence of the dead time. Therefore, there is also no need to concern about the noise and the like caused by changing the carrier frequency.

[Second Embodiment]

In the second embodiment, variation of voltage Vm is further suppressed by operating boost converter 10 such that the power ripple caused by rotation of motor generator M1 can be absorbed in DC power supply B.

Referring back to FIG. 1, the entire configuration of the electrical system of the electrically powered vehicle to which a control device 30A of the converter according to the second embodiment is applied is the same as that in the first embodiment shown in FIG. 1.

Figure 11:
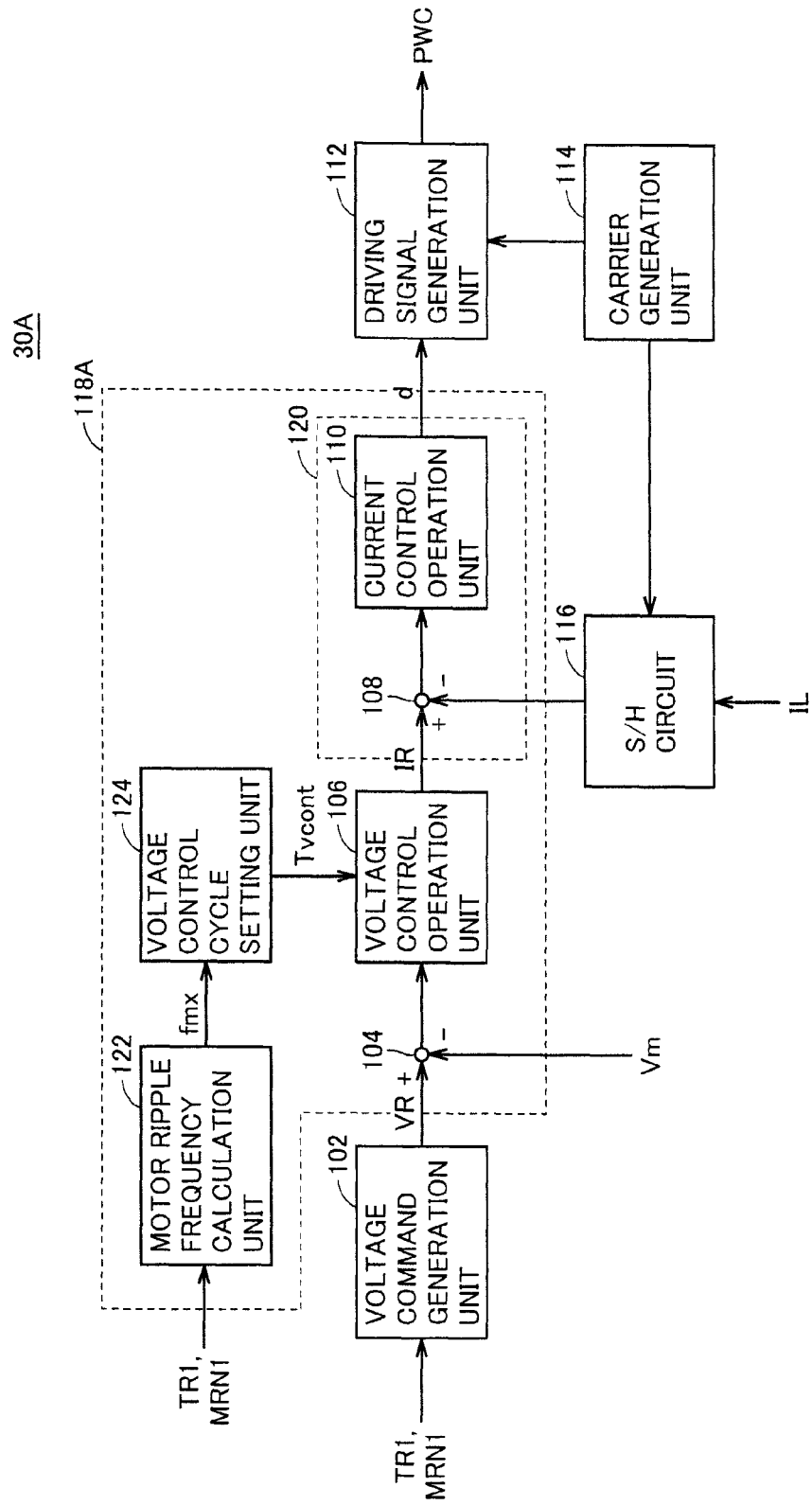
FIG. 11 is a functional block diagram of a portion of the control device in the second embodiment that is related to control of a boost converter.

FIG. 11 is a functional block diagram of a portion of control device 30A according to the second embodiment that is related to control of boost converter 10. Referring to FIG. 11, control device 30A has the configuration which is the same as that of control device 30 shown in FIG. 2 but additionally includes a motor ripple frequency calculation unit 122 and a voltage control cycle setting unit 124.

Based on torque command value TR1 and motor rotation speed MRN1 of motor generator M1, motor ripple frequency calculation unit 122 calculates a frequency fmx of the power ripple caused by rotation of motor generator M1. For example, motor ripple frequency calculation unit 122 calculates frequency fmx based on torque command value TR1 and motor rotation speed MRN1 by referring to the map prepared in advance about the relationship of the torque and the rotation speed of motor generator M1 with the frequency of the power ripple caused by rotation of motor generator M1.

Alternatively, it is known that the power ripple of an electric six-order component (the six-order component of the AC frequency of motor generator M1) occurs when motor generator M1 is controlled in a rectangular-wave control mode. If the control mode is a rectangular-wave control mode, the electric six-order component of motor generator M1 calculated by the following equation may be a frequency fmx.

$$fmx=(MRN1 \times p/60) \times 6 \qquad (1)$$

In this case, p is the number of pole pairs of the motor.

Based on frequency fmx calculated by motor ripple frequency calculation unit 122, voltage control cycle setting unit 124 sets a cycle Tvcont of voltage control performed by voltage control operation unit 106. Specifically, voltage control cycle setting unit 124 sets cycle Tvcont of voltage control to be not more than one fourth of the cycle (1/fmx) corresponding to frequency fmx, as represented by the following equation.

$$Tvcont \leq 1/fmx/4 \qquad (2)$$

In this case, the reason why cycle Tvcont of voltage control is set to be not more than one fourth of the cycle (1/fmx) corresponding to frequency fmx is for reliably detecting the ripple generated at frequency fmx. For example, when cycle Tvcont of voltage control is one half of the cycle (1/fmx), there is a possibility that the ripple generated at frequency fmx cannot be detected. In addition, in consideration of the load of control device 30A performing the control operation of voltage control, it is preferable that cycle Tvcont is set at 1/fmx/4.

Cycle Tvcont set by voltage control cycle setting unit 124 is output to voltage control operation unit 106 which then performs a control operation at cycle Tvcont.

Figure 12:
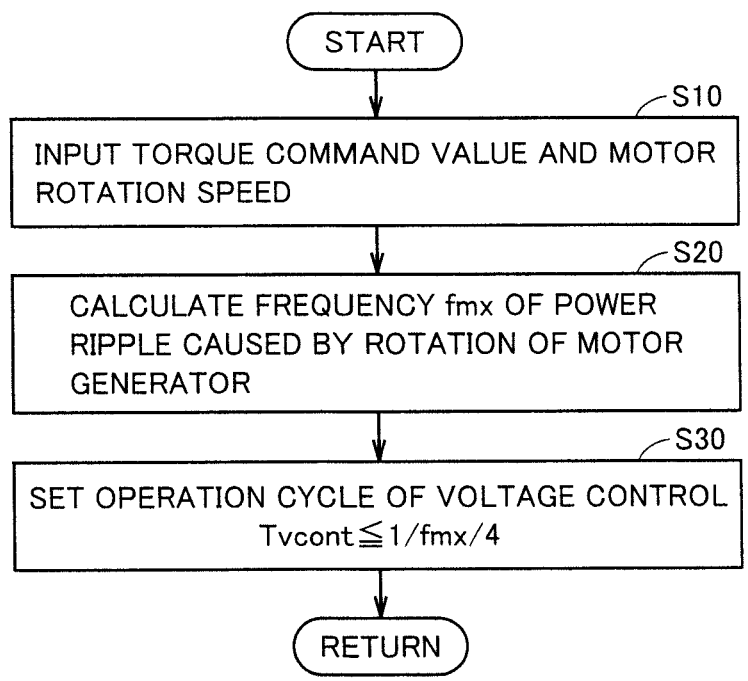
FIG. 12 is a flow chart for illustrating the operation cycle setting process of the voltage control performed by the control device.

FIG. 12 is a flow chart for illustrating the operation cycle setting process of the voltage control performed by control device 30A. The process shown in this flow chart is performed as it is called from a main routine and executed at regular intervals or every time predetermined conditions are satisfied.

Referring to FIG. 12, control device 30A inputs torque command value TR1 and motor rotation speed MRN1 of motor generator M1 (step S10). Then, control device 30A refers to the map and the like prepared in advance to calculate frequency fmx of the power ripple caused by rotation of motor generator M1 based on torque command value TR1 and motor rotation speed MRN1 (step S20).

Then, using the above-described equation (2), control device 30A sets cycle Tvcont of voltage control based on frequency fmx calculated in step S20 (step S30). For example, control device 30A sets cycle Tvcont at 1/fmx/4. Then, control device 30A performs voltage control for boost converter 10 at cycle Tvcont that has been set.

Figure 13:
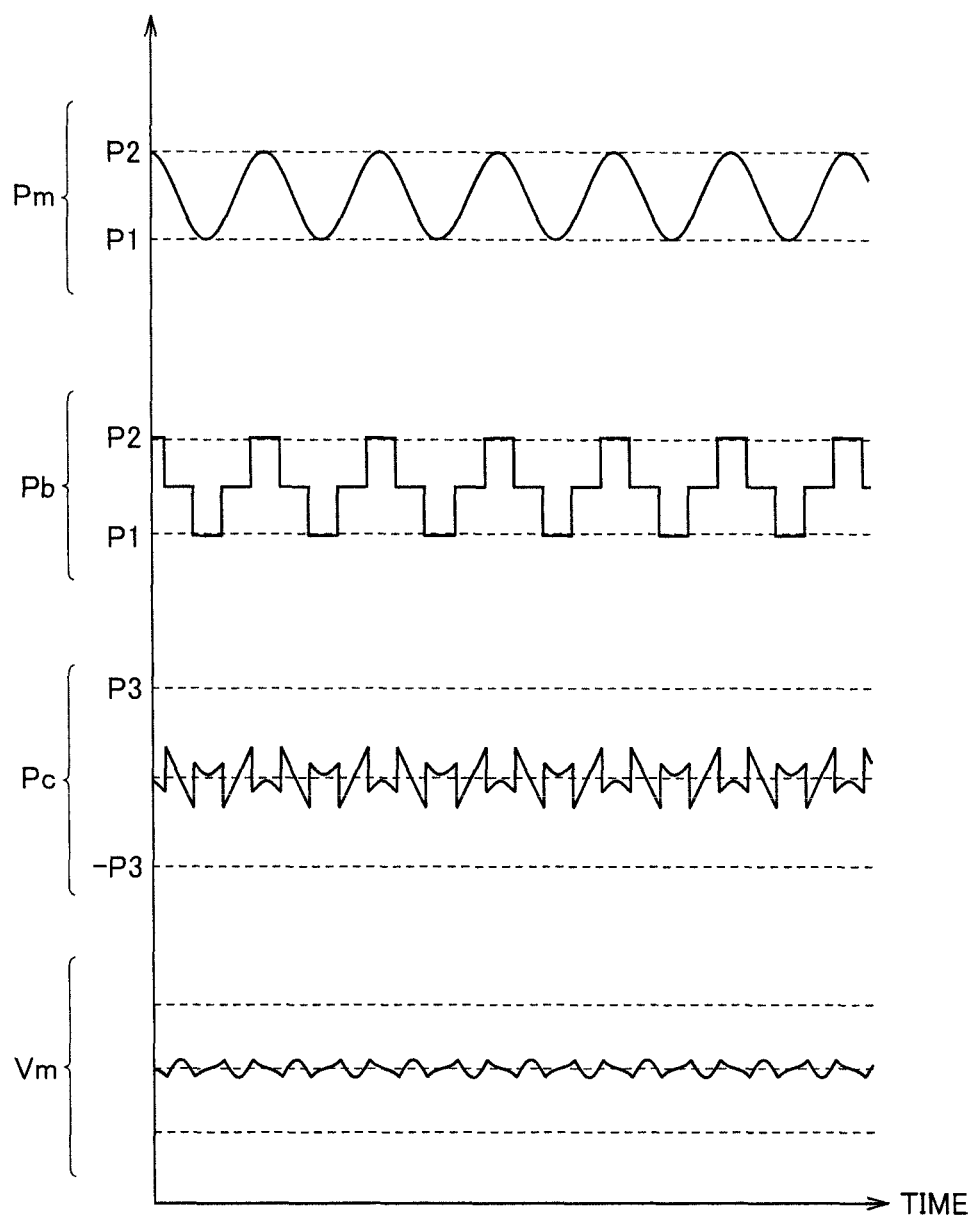
FIG. 13 is a diagram showing the power ripple caused by rotation of a motor generator and the control effects in the third embodiment.

FIG. 13 is a diagram showing the power ripple caused by rotation of motor generator M1 and the control effects in the third embodiment. For the purpose of comparison, FIG. 14 shows the case where the power ripple caused by rotation of motor generator M1 is not absorbed in DC power supply B.

Referring to FIG. 13, an electric power Pm is an electric power of motor generator M1, in which a ripple is generated in association with rotation of motor generator M1. In the second embodiment, the voltage control of boost converter 10 is performed in accordance with the ripple of electric power Pm, and the ripple of electric power Pm is absorbed by DC power supply B (electric power Pb of DC power supply B varies in synchronization with the ripple of electric power Pm of the motor). This allows suppression of the variation of each of electric power Pc and voltage Vm of smoothing capacitor C provided on the output side of boost converter 10.

Figure 14:
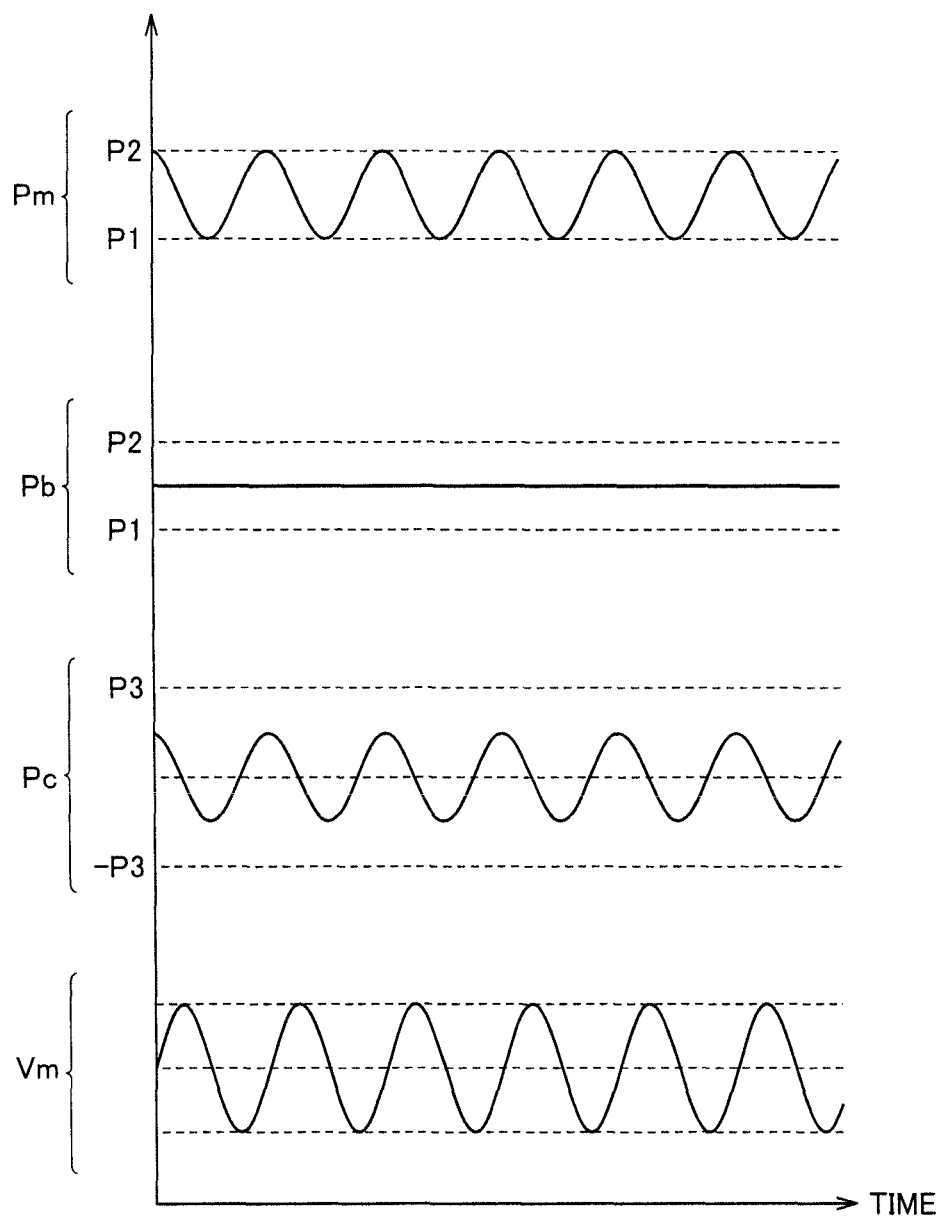
FIG. 14 is a diagram showing the case where the power ripple caused by rotation of the motor generator is not absorbed by a DC power supply.

In contrast, referring to FIG. 14, if the power ripple caused in association with rotation of motor generator M1 is not absorbed by DC power supply B, the ripple of electric power Pm appears as it is in electric power Pc of smoothing capacitor C. Consequently, voltage Vm may significantly vary.

In the above description, variation of voltage Vm can be suppressed on the assumption that smoothing capacitor C has a conventional level of capacity. However, in the case where voltage Vm can be allowed to vary to the conventional level, the capacity of smoothing capacitor C can be decreased.

As described above, in the second embodiment, since the operation cycle of the voltage control is set such that the voltage control for boost converter 10 is performed in accordance with the ripple of electric power Pm, the ripple of electric power Pm is absorbed by DC power supply B. Therefore, according to the second embodiment, the variation of voltage Vm can be further suppressed. Consequently, smoothing capacitor C can be decreased in size, thereby allowing a reduction in size and cost of the device. Furthermore, since the charging and discharging current of smoothing capacitor C is decreased, heat generation of smoothing capacitor C is also suppressed.

[Third Embodiment]

In the third embodiment, the power ripple caused by rotation of motor generator M1 is estimated and the current of boost converter 10 is changed in accordance with the estimated power ripple, thereby suppressing variation of voltage Vm.

Referring back to FIG. 1, the entire configuration of the electrical system of the electrically powered vehicle to which a control device 30B of the converter according to this third embodiment is applied is the same as that in the first embodiment shown in FIG. 1.

Figure 15:
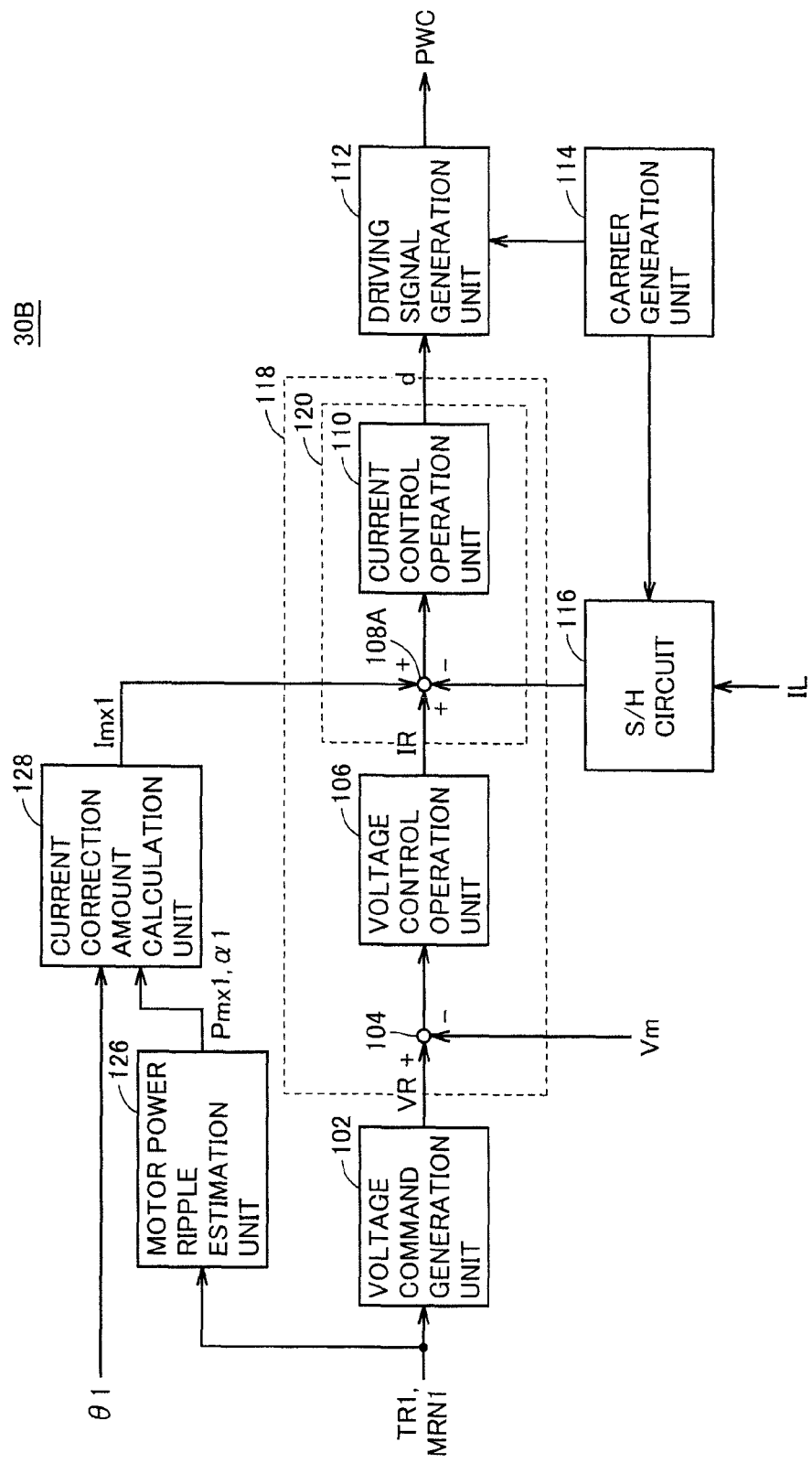
FIG. 15 is a functional block diagram of a portion of the control device in the third embodiment that is related to control of the boost converter.

FIG. 15 is a functional block diagram of a portion of control device 30B according to third embodiment that is related to control of boost converter 10. Referring to FIG. 15, control device 30B has the configuration which is the same as that of control device 30 shown in FIG. 2 but additionally includes a motor power ripple estimation unit 126 and a current correction amount calculation unit 128 and also includes an operation unit 108A in place of subtraction unit 108.

Based on torque command value TR1 and motor rotation speed MRN1 of motor generator M1, motor power ripple estimation unit 126 estimates the amplitude and the phase of the power ripple which is generated by rotation of motor generator M1. For example, motor power ripple estimation unit 126 refers to the map prepared in advance about the relationship of the torque and the rotation speed of motor generator M1 with the amplitude and the phase of the six-order component of the power ripple caused in association with rotation of motor generator M1, to estimate an amplitude Pmx1 and a phase α1 of the six-order component of the power ripple based on torque command value TR1 and motor rotation speed MRN1.

Based on amplitude Pmx1 and phase α1 of the power ripple estimated by motor power ripple estimation unit 126 and also on the detection value of rotation angle θ1 from rotation angle sensor 62, current correction amount calculation unit 128 calculates a current correction amount Imx1 corresponding to the power ripple based on the following equation.

$$Imx1 = \{Pmx1 \times \sin(6 \times \theta1 + \alpha1)\}/Vm \quad (3)$$

Then, operation unit 108A adds current correction amount Imx1 to current command value IR output from voltage control operation unit 106, further subtracts the detection value of current IL sampled/held by S/H circuit 116, and then outputs the calculation result to current control operation unit 110.

Figure 16:
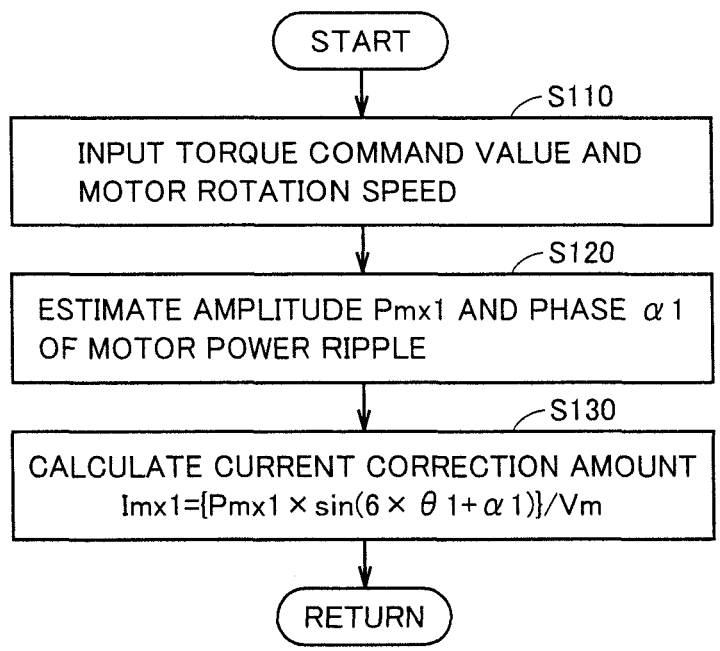
FIG. 16 is a flow chart for illustrating the calculation process of a current correction amount performed by the control device.

FIG. 16 is a flow chart for illustrating the calculation process of the current correction amount performed by control device 30B. The process shown in this flow chart is also performed as it is called from a main routine and executed at regular intervals or every time predetermined conditions are satisfied.

Referring to FIG. 16, control device 30B inputs torque command value TR1 and motor rotation speed MRN1 of motor generator M1 (step S110). Then, control device 30B refers to the map prepared in advance to estimate amplitude Pmx1 and phase α1 of the six-order component of the power ripple caused by rotation of motor generator M1 based on torque command value TR1 and motor rotation speed MRN1 (step S120).

Then, using the above-described equation (3), control device 30B calculates current correction amount Imx1 based on amplitude Pmx1 and phase α1 estimated in step S120 (step S130).

In the above description, since the ripple of the electric six-order component is relatively large, it is configured by way of example such that the six-order component of the power ripple caused by rotation of motor generator M1 is estimated to perform current correction based on this estimated value. However, other order components may be estimated in accordance with the circumstance of occurrence of the power ripple, to perform a current correction based on this estimated value.

As described above, in the third embodiment, the power ripple caused by rotation of motor generator M1 is estimated to correct the command value for current control in accordance with the estimated power ripple. Consequently, the power ripple may be absorbed in DC power supply B. Therefore, the same effects as those in the second embodiment can also be achieved by the third embodiment.

Furthermore, according to the third embodiment, since it is not necessary to change the operation cycle of the voltage control or not necessary to increase the operation cycle, the processing load of control device 30B can be suppressed.

[Fourth Embodiment]

The fourth embodiment presents the embodiment in the case where the control in the third embodiment is applied to a dual-motor system.

Figure 17:
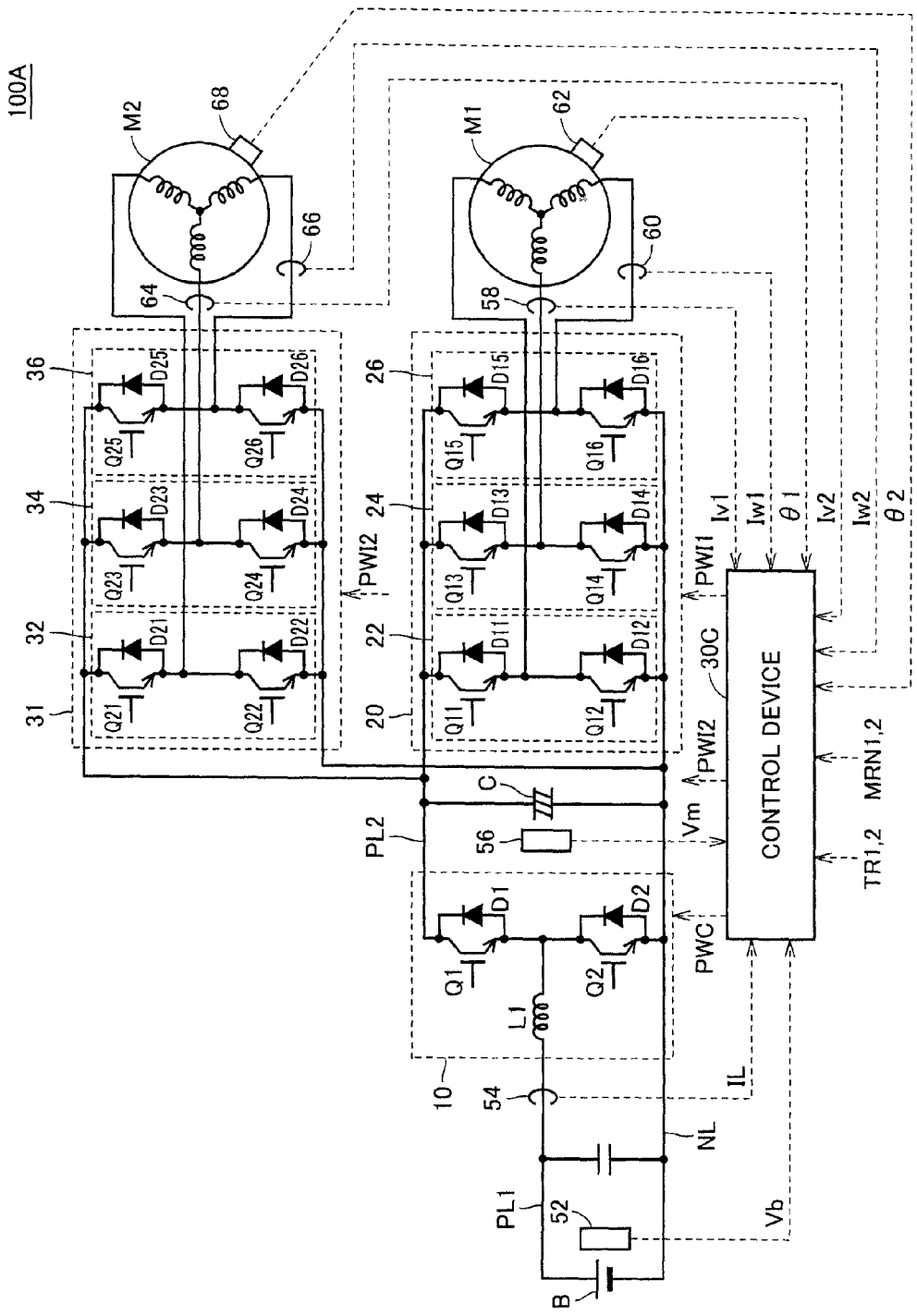
FIG. 17 is a diagram showing an electrical system of an electrically powered vehicle to which the control device for a converter according to the fourth embodiment is applied.

FIG. 17 is a diagram showing the electrical system of the electrically powered vehicle to which the control device for a converter according to the fourth embodiment is applied. Referring to FIG. 17, electrically powered vehicle 100A has the configuration which is the same as that of electrically powered vehicle 100 shown in FIG. 1 but additionally includes an inverter 31, a motor generator M2, current sensors 64 and 66, and a rotation angle sensor 68 and also includes a control device 30C in place of control device 30.

Inverter 31 includes a U-phase arm 32, a V-phase arm 34 and a W-phase arm 36. U-phase arm 32, V-phase arm 34 and W-phase arm 36 are connected in parallel between positive electrode line PL2 and negative electrode line NL. U-phase arm 32 includes switching elements Q21 and Q22 connected in series. V-phase arm 34 includes switching elements Q23 and Q24 connected in series. W-phase arm 36 includes switching elements Q25 and Q26 connected in series. Diodes D21 to D26 are provided between the collector and the emitter of each of switching elements Q21 to Q26, respectively, to cause a current to flow from the emitter side to the collector side. Then, the intermediate point of each phase arm is connected to each phase coil of motor generator M2.

Based on a signal PWI2 from control device 30C, inverter 31 converts the DC power supplied from positive electrode line PL2 and negative electrode line NL into a three-phase alternating current, to output this current to motor generator M2 and drive motor generator M2. This causes motor generator M2 to be driven so as to generate a torque specified by a torque command value TR2.

Motor generator M2 is also an AC electric motor as with motor generator M1 which is, for example, a three-phase AC electric motor provided with a rotor having a permanent magnet embedded therein. Current sensors 64 and 66 detect a V-phase current Iv2 and a W-phase current Iw2, respectively, and output these detection values to control device 30C. Rotation angle sensor 68 detects a rotation angle θ2 of the rotor of motor generator M2 and outputs the detection value to control device 30C.

Control device 30C not only generates signal PWC for driving boost converter 10 and signal PWI1 for driving motor generator M1, but also generates signal PWI2 for driving motor generator M2 based on the detection value of each of currents Iv2 and Iw2 from current sensors 64 and 66, respectively, rotation angle θ2 from rotation angle sensor 68 and voltage Vm, and torque command value TR2 and motor rotation speed MRN2 of motor generator M2 which are received from an external ECU which is not shown. Then, control device 30C outputs the generated signal PWI2 to inverter 31.

Figure 18:
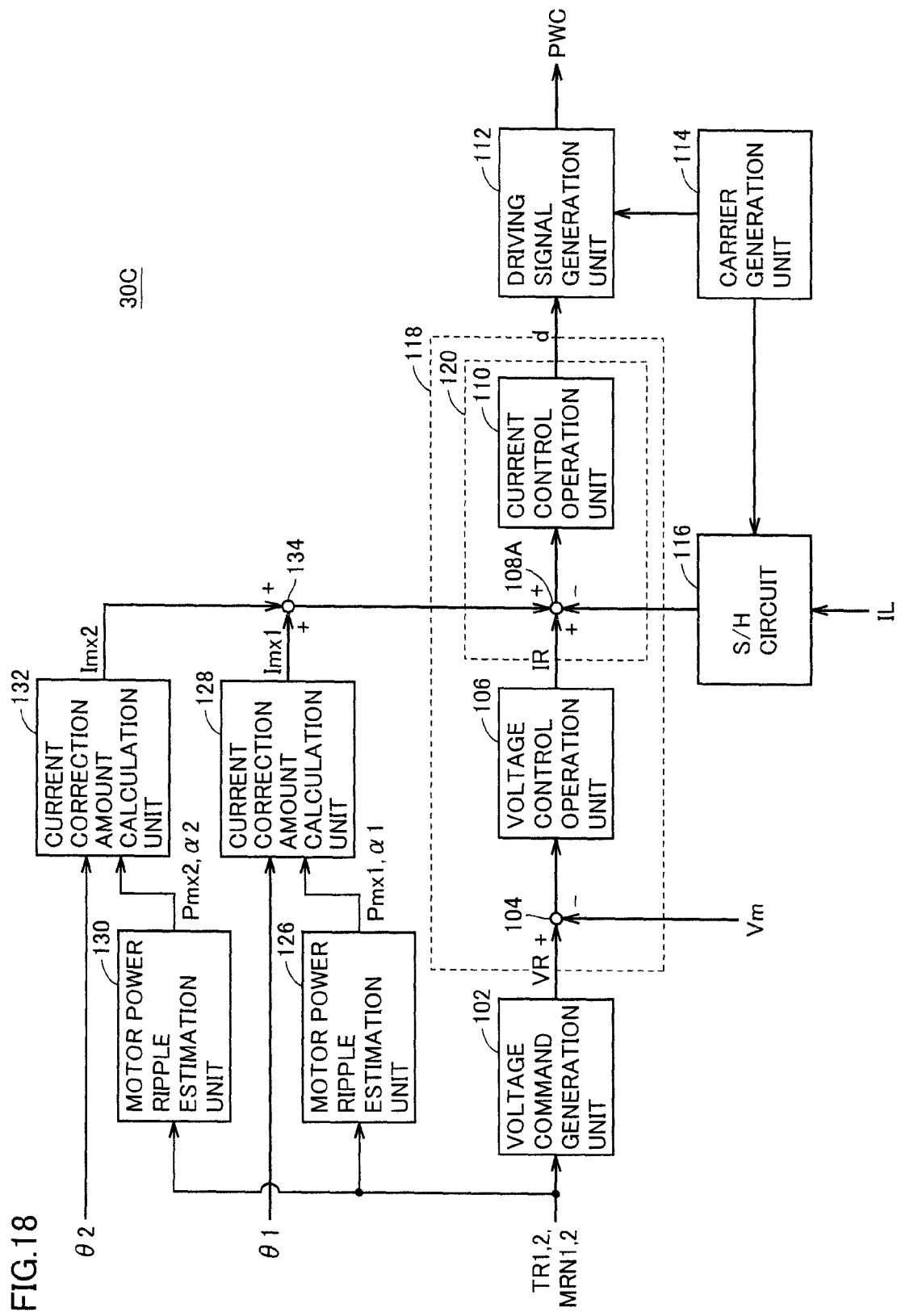
FIG. 18 is a functional block diagram of a portion of the control device in the fourth embodiment that is related to control of the boost converter.

FIG. 18 is a functional block diagram of a portion of control device 30C in the fourth embodiment that is related to control of boost converter 10. Referring to FIG. 18, control device 30C has the configuration which is the same as that of control device 30B shown in FIG. 15 but additionally includes a motor power ripple estimation unit 130, a current correction amount calculation unit 132 and an addition unit 134.

Based on torque command value TR2 and motor rotation speed MRN2 of motor generator M2, motor power ripple estimation unit 130 estimates the amplitude and the phase of the power ripple caused in association with rotation of motor generator M2. For example, motor power ripple estimation unit 130 refers to the map prepared in advance about the relationship of the torque and the rotation speed of motor generator M2 with the amplitude and the phase of the six-order component of the power ripple caused by rotation of motor generator M2, to estimate an amplitude Pmx2 and a phase α2 of the six-order component of the power ripple based on torque command value TR2 and motor rotation speed MRN2.

Based on amplitude Pmx2 and phase α2 of the power ripple estimated by motor power ripple estimation unit 130 and the detection value of rotation angle θ2 from rotation angle sensor 68, current correction amount calculation unit 132 calculates a current correction amount Imx2 corresponding to the power ripple based on the following equation.

$$Imx2=\{Pmx2 \times \sin(6 \times \theta2 + \alpha2)\}/Vm \quad (4)$$

Addition unit 134 adds current correction amount Imx2 calculated by current correction amount calculation unit 132 to current correction amount Imx1 calculated by current correction amount calculation unit 128, and then outputs the added value to operation unit 108A.

Operation unit 108A then adds current correction amounts Imx1 and Imx2 to current command value IR output from voltage control operation unit 106, further subtracts the detection value of current IL sampled/held by S/H circuit 116, and then outputs the calculation result to current control operation unit 110.

Figure 19:
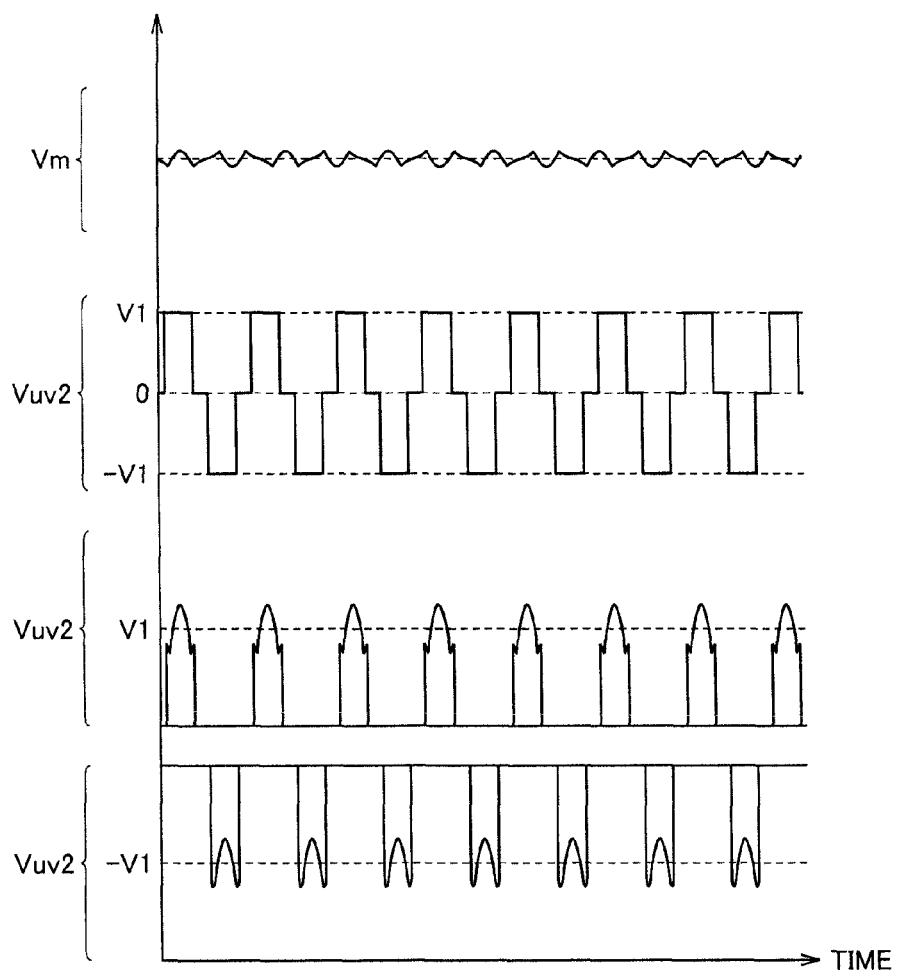
FIG. 19 is a diagram showing the control effect in the fourth embodiment.

FIG. 19 is a diagram showing the control effects of the fourth embodiment. It is to be noted that FIG. 19 shows the case where the power ripple caused by rotation of motor generator M1 completely overlaps with the power ripple caused by rotation of motor generator M2. For the purpose of comparison, FIG. 20 shows the case where current correction based on current correction amounts Imx1 and Imx2 is not carried out.

Figure 20:
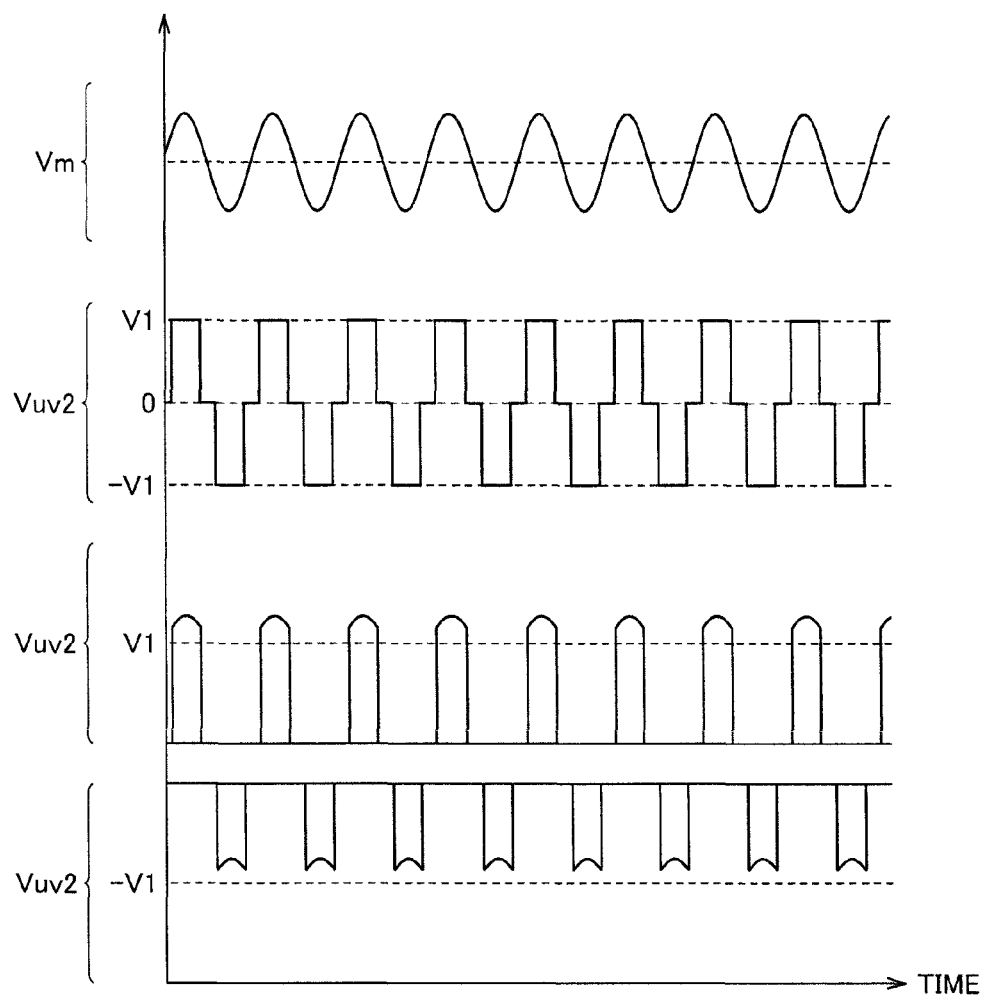
FIG. 20 is a diagram showing the case where no current correction is performed.

Referring to FIGS. 19 and 20, according to the fourth embodiment, the variation of voltage Vm is suppressed by performing current correction based on current correction amounts Imx1 and Imx2 (FIG. 19).

Furthermore, in the case where current correction based on current correction amounts Imx1 and Imx2 is not carried out due to the interference (completely overlapped state) of the power ripples in motor generators M1 and M2, the correlation voltage (FIGS. 19 and 20 each show a u-v interphase voltage Vuv2 of motor generator M2, by way of example) is offset with respect to target voltages V1 and −V1 (FIG. 20). According to this fourth embodiment, since the current correction is carried out in accordance with the ripple power of each of motor generators M1 and M2, the voltage offset as described above does not occur (FIG. 19).

As described above, according to the fourth embodiment, the same effects as those in the third embodiment can be achieved. Furthermore, according to the fourth embodiment, the mutual interference between motor generators M1 and M2 can be suppressed.

In addition, in each of the above-described embodiments, electrically powered vehicles 100 and 100A each may be an electric vehicle provided with motor generator M1 or M2 as a single power source for driving the vehicle, or may be a hybrid vehicle further equipped with an engine as a power source for driving the vehicle, and furthermore, may be a fuel cell vehicle further provided with a fuel cell in addition to DC power supply B.

In the above description, boost converter 10 corresponds to a "converter" in the present invention, and switching elements Q1 and Q2 correspond to the "first switching element" and the "second switching element", respectively, in the present invention. Furthermore, motor power ripple estimation unit 126 and current correction amount calculation unit 128 constitute the "first variation estimation unit" in the present invention, while motor power ripple estimation unit 130 and current correction amount calculation unit 132 constitute the "second variation estimation unit" in the present invention. Furthermore, inverter 20 and motor generator M1 constitute a "driving force generation unit" in the present invention.

It should be understood that the embodiments disclosed herein are illustrative and non-restrictive in every respect. The scope of the present invention is defined by the terms of the claims, rather than the description of the embodiments provided above, and is intended to include any modifications within the scope and meaning equivalent to the terms of the claims.

Reference Signs List 10 boost converter, 20, 31 inverter, 22, 32 U-phase arm, 24, 34 V-phase arm, 26, 36 W-phase arm, 30, 30A to 30C control device, 52, 56 voltage sensor, 54, 58, 60, 64, 66 current sensor, 62, 68 rotation angle sensor, 100, 100A electrically powered vehicle, 102 voltage command generation unit, 104, 108 subtraction unit, 108A operation unit, 106 voltage control operation unit, 110 current control operation unit, 112 driving signal generation unit, 114 carrier generation unit, 116 sample/hold circuit, 118 main loop, 120 minor loop, 122 motor ripple frequency calculation unit, 124 voltage control cycle setting unit, 126, 130 motor power ripple estimation unit, 128,132 current correction amount calculation unit, 134 addition unit, B DC power supply, PL1, PL2 positive electrode line, NL negative electrode line, L1 reactor, Q1, Q2, Q11 to Q16, Q21 to Q26 switching element, D1, D2, D11 to D16, D21 to D26 diode, C smoothing capacitor, M1, M2 motor generator.

The invention claimed is:

1. A control device for a converter, said converter being provided between a DC power supply and an electrical load device and boosting an output voltage to be not less than a voltage of said DC power supply, said converter comprising:
a reactor having one end connected to a positive electrode of said DC power supply;
a first switching element connected between the other end of said reactor and said electrical load device;
a second switching element connected between the other end of said reactor and a negative electrode of said DC power supply; and
first and second diodes connected in anti-parallel to said first and second switching elements, respectively,
an operation of said first and second switching elements including a dead time for preventing said first and second switching elements from being simultaneously brought into conduction, and
said control device comprising:
a voltage control unit performing a control operation for adjusting said output voltage to a target voltage;
a current control unit performing a control operation for adjusting a current flowing through said reactor to a target current, using a control output of said voltage control unit as said target current; and
a signal generation unit generating a signal for driving said first and second switching elements based on the control output of said current control unit.

2. The control device for a converter according to claim 1, wherein
said electrical load device includes an electric motor, and
said control device further comprises a voltage control cycle setting unit setting an operation cycle of said voltage control unit based on a cyclical electric power variation caused by rotation of said electric motor.

3. The control device for a converter according to claim 2, wherein said voltage control cycle setting unit sets said operation cycle to be not more than one fourth of a cycle of said electric power variation.

4. The control device for a converter according to claim 1, wherein
said electrical load device includes a first electric motor,
said control device further comprises a first variation estimation unit estimating a first variation amount showing a cyclical electric power variation amount generated by rotation of said first electric motor based on a torque and a rotation speed of said first electric motor, and
said current control unit performs the control operation using, as said target current, a value obtained by adding said first variation amount to the control output of said voltage control unit.

5. The control device for a converter according to claim 4, wherein
said electrical load device further includes a second electric motor,
said control device further comprises a second variation estimation unit estimating a second variation amount showing a cyclical electric power variation amount generated by rotation of said second electric motor based on a torque and a rotation speed of said second electric motor, and
said current control unit performs the control operation using, as said target current, a value obtained by adding said first variation amount and said second variation amount to the control output of said voltage control unit.

6. An electrically powered vehicle comprising:
a DC power supply;
a driving force generation unit generating a driving force for a vehicle using an electric power supplied from said DC power supply;
the converter according to claim 1 provided between the DC power supply and said driving force generation unit and boosting an input voltage of said driving force generation unit to a value not less than a voltage of said DC power supply; and
the control device for a converter according to claim 1.

* * * * *